US012533122B2

(12) United States Patent
Smith et al.

(10) Patent No.: US 12,533,122 B2
(45) Date of Patent: Jan. 27, 2026

(54) SUTURING APPARATUS AND METHOD

(71) Applicant: GYRUS ACMI, INC., Westborough, MA (US)

(72) Inventors: Adam Smith, San Francisco, CA (US); Clifton A. Alferness, Westborough, MA (US); Gina M. Muia-Longman, Seattle, WA (US); David R. Seward, Seattle, WA (US); Chenhao Fu, Renton, WA (US); Ilia Timonin, Seattle, WA (US); Blake Stancik, Mukilteo, WA (US); Amanda Kay Woodcock, Seattle, WA (US); David A. Desmarais, Seattle, WA (US); Donald C. Baumgarten, Seattle, WA (US); Paul T. Hinrichs, Seattle, WA (US); Thomas H. Ruscher, Seattle, WA (US)

(73) Assignee: Gyrus ACMI, Inc., Westborough, MA (US)

( * ) Notice: Subject to any disclaimer, the term of this patent is extended or adjusted under 35 U.S.C. 154(b) by 643 days.

(21) Appl. No.: 17/820,361

(22) Filed: Aug. 17, 2022

(65) Prior Publication Data

US 2022/0387039 A1 Dec. 8, 2022

Related U.S. Application Data

(62) Division of application No. 16/367,168, filed on Mar. 27, 2019, now Pat. No. 11,439,397.

(51) Int. Cl.
*A61B 17/04* (2006.01)
*A61B 17/11* (2006.01)
*A61B 17/06* (2006.01)

(52) U.S. Cl.
CPC ...... *A61B 17/0482* (2013.01); *A61B 17/0469* (2013.01); *A61B 17/11* (2013.01); *A61B 17/06* (2013.01); *A61B 2017/1107* (2013.01)

(58) Field of Classification Search
CPC . A61B 17/11; A61B 17/0469; A61B 17/0482; A61B 17/06; A61B 2017/1107
See application file for complete search history.

(56) References Cited

U.S. PATENT DOCUMENTS 6,015,416 A * 1/2000 Stefanchik ............. A61B 17/11
606/1
6,514,263 B1 2/2003 Stefanchik et al.
(Continued)

OTHER PUBLICATIONS

"U.S. Appl. No. 16/367,168, Final Office Action mailed Jun. 18, 2021", 13 pgs.
(Continued)

*Primary Examiner* — Sarah A Long
(74) *Attorney, Agent, or Firm* — Schwegman Lundberg & Woessner, P.A.

(57) ABSTRACT

Disclosed embodiments include apparatuses, systems, and methods for driving a needle to facilitate suturing, such as may be performed in a surgical anastomosis procedure. In an illustrative embodiment, an apparatus includes a frame. First and second rollers are rotatably mounted parallel with each other in the frame and are configured to engage therebetween a shaft of a needle formed in a helical shape. The first and second rollers are configured to counter-rotate. The needle is revolvable eccentrically around the first roller responsive to counter-rotation of the first and second rollers. A drive mechanism is secured to the frame and is configured to move the frame.

19 Claims, 6 Drawing Sheets

(56) References Cited

U.S. PATENT DOCUMENTS

| | | |
|---|---|---|
| 6,530,932 B1 | 3/2003 | Swayze et al. |
| 6,613,058 B1 * | 9/2003 | Goldin ............... A61B 17/0469 |
| | | 606/144 |
| 8,906,039 B2 | 12/2014 | Crainich |
| 11,439,397 B2 | 9/2022 | Smith et al. |
| 2019/0388087 A1 * | 12/2019 | Almodovar ........ A61B 17/0469 |
| 2020/0305876 A1 | 10/2020 | Smith et al. |

OTHER PUBLICATIONS

"U.S. Appl. No. 16/367,168, Non Final Office Action mailed Jan. 6, 2021", 15 pgs.

"U.S. Appl. No. 16/367,168, Non Final Office Action mailed Jan. 6, 2022", 12 pgs.

"U.S. Appl. No. 16/367,168, Notice of Allowance mailed May 11, 2022", 12 pgs.

"U.S. Appl. No. 16/367,168, Response filed Apr. 5, 2021 to Non Final Office Action mailed Jan. 6, 2021", 17 pgs.

"U.S. Appl. No. 16/367,168, Response filed Apr. 6, 2022 to Non Final Office Action mailed Jan. 6, 2022", 9 pgs.

"U.S. Appl. No. 16/367,168, Response filed Nov. 17, 2021 to Final Office Action mailed Jun. 18, 2021", 13 pgs.

Scheltes, Jules S, et al., "Assessment of Patented Coronary End-to-Side Anastomotic Devices Using Micromechanical Bonding", (218-221), 2000.

* cited by examiner

SUTURING APPARATUS AND METHOD

CROSS-REFERENCE TO RELATED APPLICATION

This application is a Divisional of U.S. patent application Ser. No. 16/367,168, filed Mar. 27, 2019, the contents of which are hereby incorporated by reference.

FIELD

The present disclosure relates to apparatuses, systems, and methods for suturing an object such as a juncture of two passages.

BACKGROUND

The statements in this section merely provide background information related to the present disclosure and may not constitute prior art.

Surgical anastomosis enables segments of one or more arteries, blood vessels, intestines, or any other passages to be connected or reconnected, such as in coronary artery bypass graft (CABG) procedures. In a CABG procedure, for example, a saphenous vein may be harvested from a patient's leg and grafted to circumvent a coronary arterial blockage. Such procedures are tremendously useful and may regularly save and extend lives.

However, CABG procedures and similar procedures involve highly invasive surgery. For example, a typical CABG procedure involves performing a median sternotomy in which a vertical incision is made along the patient's sternum, after which the sternum itself is actually broken open to provide access to the heart and surrounding arteries. The median sternotomy provides a surgeon with space to insert a graft and suture the graft to a coronary artery to complete the process. However, the sizable incision and the breaking of the sternum may involve significant scarring, discomfort, and risk of infection, and may require significant recovery time for the healing of the affected structures.

SUMMARY

Disclosed embodiments include apparatuses, systems, and methods for driving a needle to facilitate suturing, such as may be performed in a surgical anastomosis procedure involving veins, arteries, or other passages.

In an illustrative embodiment, an apparatus includes a frame. First and second rollers are rotatably mounted parallel with each other in the frame and are configured to engage therebetween a shaft of a needle formed in a helical shape. The first and second rollers are configured to counter-rotate. The needle is revolvable eccentrically around the first roller responsive to counter-rotation of the first and second rollers. A drive mechanism is secured to the frame and is configured to move the frame.

In another embodiment, a system includes a needle formed in a helical shape, where the needle includes a shaft having a trailing end configured to draw a filament and a leading end shaped to pierce an object. A drive track is positionable to guide a path of the needle. A needle drive mechanism includes a frame. First and second rollers are rotatably mounted parallel with each other in the frame and are configured to engage therebetween a shaft of a needle formed in a helical shape. The first and second rollers are configured to counter-rotate. The needle is revolvable eccentrically around the first roller responsive to counter-rotation of the first and second rollers. A drive mechanism is secured to the frame and is configured to move the frame along the drive track.

In a further illustrative embodiment, in an illustrative method opposing sides of a shaft of a needle are engaged between parallel faces of first and second rollers, where the needle is formed in a helical shape and configured to draw a filament from its trailing end. The first and second rollers are counter-rotated to cause the helically-shaped needle to revolve eccentrically around the first roller positioned adjacent to an object to cause a leading end of the needle to pierce the object adjacent to an outer face of the first roller. The first and second rollers are translated along an edge of the object. Counter-rotating the first and second rollers and translating the first and second rollers causes the needle to draw the filament to suture the edge of the object adjacent the outer face of the first roller.

Further features, advantages, and areas of applicability will become apparent from the description provided herein. It will be appreciated that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, with emphasis instead being placed upon illustrating the principles of the disclosed embodiments. In the drawings.

DETAILED DESCRIPTION

It will be noted that the first digit of three-digit reference numbers corresponds to the figure number in which the element first appears.

The following description explains, by way of illustration only and not of limitation, various embodiments of noninvasive apparatuses, systems, and methods for suturing an object, such as a juncture of passages being joined together in a surgical anastomosis procedure.

Figure 1:
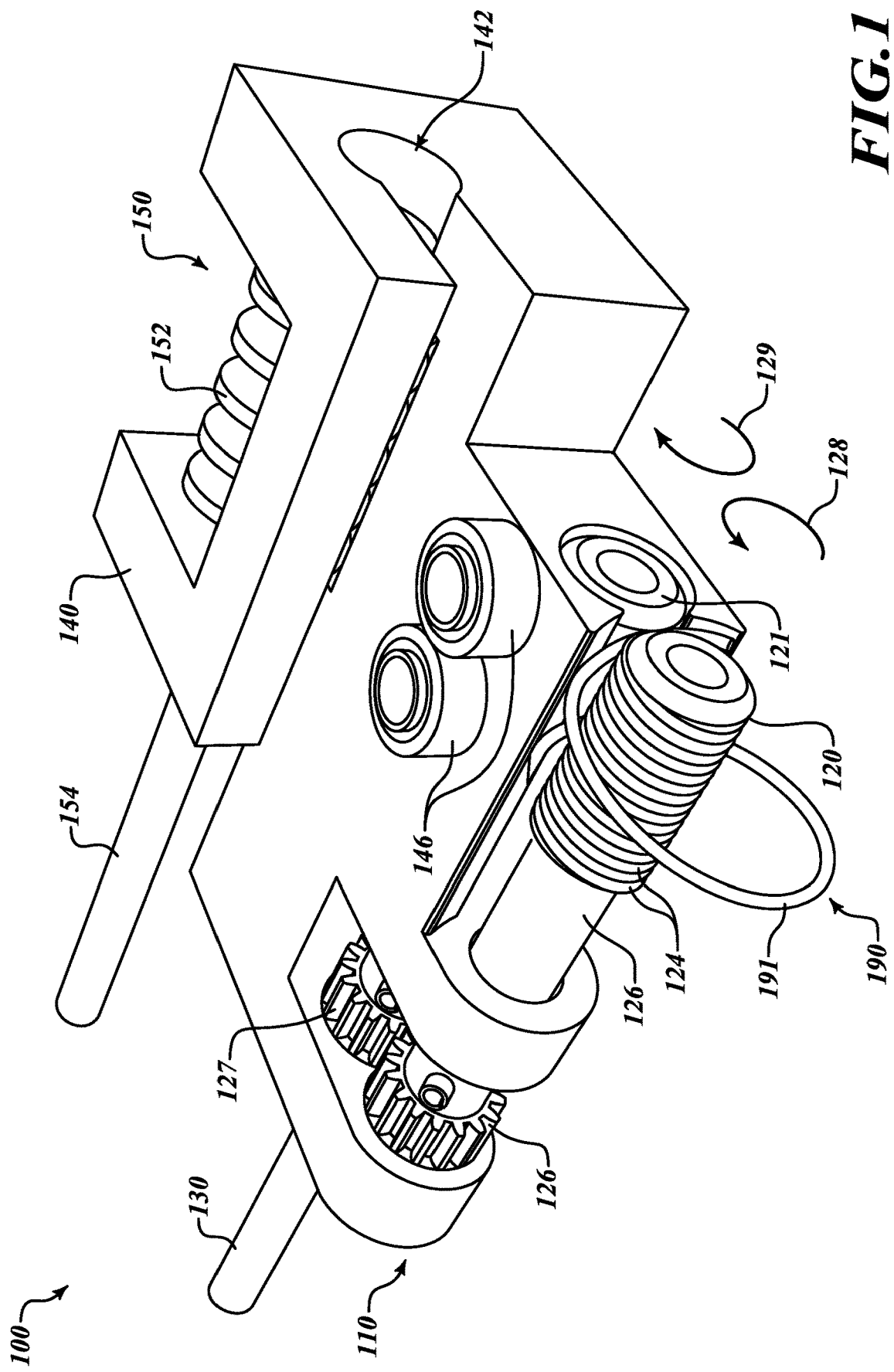
FIG. 1 is a perspective view of an embodiment of an apparatus for suturing an object with a helically-shaped needle.

Given by way of non-limiting overview and referring to FIG. 1, in various embodiments an apparatus 100 includes a frame 110. Rollers 120 and 121 are rotatably mounted parallel with each other in the frame 110 and are configured to engage therebetween a shaft 191 of a needle 190 formed in a helical shape. The rollers 120 and 121 are configured to counter-rotate. The needle 190 is revolvable eccentrically around the roller 120 responsive to counter-rotation of the rollers 120 and 121. A drive mechanism 150 is secured to the frame 110 and is configured to move the frame 110.

Now that an overview has been given, details of various embodiments will be explained by way of non-limiting examples given by way of illustration only and not of limitation.

Still referring to FIG. 1, in various embodiments the apparatus 100 may be well suited for suturing together passages or other objects. In such embodiments the frame 110 is adapted for supporting the rollers 120 and 121. The rollers 120 and 121 are configured to drive the needle 190 to draw a filament to suture one or more objects (not shown in FIG. 1). In the example of a CABG procedure, the objects may include an end of a donor passage and an opening in a receiving passage that may be joined together with sutures to complete an anastomosis procedure. In various embodiments the apparatus 100 is adapted to be compact for insertion into a bodily cavity, for example, by insertion into a patient's chest cavity via a subxiphoid incision made below a sternum of the patient (not shown). It will be appreciated that insertion of the apparatus 100 inserted through a relatively minor incision for use in suturing may help contribute to reducing potential trauma, risk, and protracted healing process that may result from performance of a median sternotomy, as commonly may be used to perform the implantation and suturing of a donor vein in a conventional CABG procedure.

However, it will be appreciated that use of the apparatus 100 is not limited to CABG procedures. Given by way of non-limiting examples, the apparatus 100 may be used for suturing in other procedures, such as without limitation, forming suturing an arteriovenous fistula between an artery and a vein for dialysis, suturing a colostomy formed between the bowel and the skin of the abdominal wall, or in coupling ends of intestinal sections when a formerly intervening portion has been removed. As such, it will be appreciated that no such limitations are intended and are not to be inferred.

In various embodiments, recesses in the frame 110 receive the rollers 120 and 121, as further described below with reference to FIG. 2. The recesses in the frame enable the rollers 120 and 121 to rotate and to be driven by an external source of rotational force. Although only the roller 120 is exposed in FIG. 1, the roller 121 may have a structure similar to that of the roller 120, as described below with reference to FIG. 2. The roller 120 includes a cylinder 122 which defines a number of grooves 124 that are sized and shaped to engage the shaft 191 of the needle 190. Specifically, the grooves 124 are shaped to have a width and cross-sectional shape to at least partially receive the shaft 191 of the needle 190. The grooves 124 also are angled to accommodate a pitch of the needle 190. The width and pitch of the grooves 124 are further described below with reference to FIG. 2. In various embodiments, the cylinder 122 of the roller 120 may also define feature the grooves 124, while the roller 121 may have a generally flat surface or flat and textured surface configured to press the needle 190 into the grooves 124 of the roller 120.

In various embodiments, drive gears 126 and 127 are configured to engage the rollers 120 and 121, respectively. In some embodiments, the drive gears 126 and 127 may be coupled with the rollers 120 and 121, respectively. In some other embodiments, the drive gears 126 and 127 may be integrally formed as part of the rollers 120 and 121, respectively. The drive gears 126 and 127 are interleaved so that rotation of the roller 120 in a first direction causes the roller 121 to counter-rotate in a second, opposite direction. As a result, imparting a rotational force to the roller 121, for example, causes the roller 121 to rotate in a first rotational direction (as indicated by an arrow 128) and cause the roller 120 to counter-rotate in a second rotational direction (as indicated by an arrow 129 that is opposite the first rotational direction). A rotatable member 130, such as a drive shaft or a drive cable, may be directly mechanically coupled to the roller 120 or the roller 121 to provide rotational force to one of the rollers 120 and 121 to cause the rollers 120 and 121 to counter-rotate.

In various embodiments, the needle 190 has a radius larger than that of the roller 120 around which the needle 190 rotates. Thus, when the shaft 191 of the needle 190 is engaged between the rollers 120 and 121, an axis of the needle 190 and an axis of the roller 120 are not colinear. As a result, rotation of the needle 190 (caused by the counter-rotation of the rollers 120 and 121) causes the needle 190 to rotate eccentrically around the roller 120. The eccentric rotation of the needle 190 enables the rollers 120 and 121 to drive the needle 190, thereby causing the needle 190 to repeatedly pierce an object (not shown in FIG. 1) that is adjacent to the roller 120.

In various embodiments, the apparatus 100 may be adapted to follow a drive track (not shown in FIG. 1) that guides the apparatus 100 to operate along a particular course around an object to be sutured (not shown in FIG. 1). In such embodiments, a guide bracket 140 may be disposed on the frame 110. The guide bracket 140 defines an internal guide 142 that is shaped to receive an edge of the drive track so as to hold the frame 110 onto the drive track. The guide bracket 140 also may be configured to receive a drive mechanism 150 and to hold the drive mechanism 150 against the drive track to enable the drive mechanism 150 to motivate the apparatus 100 along the drive track. The frame 110 may include one or more transverse rollers 146 that are configured to rollably engage the drive track to hold the frame 110 to the drive track. The transverse rollers 146 may be mounted on the frame 110 on or adjacent to the guide bracket 140 as shown in FIG. 1.

In various embodiments, the drive mechanism 150 includes a worm gear 152 that is pitched so that rotation of the worm gear 152 moves the apparatus 100 along the drive track. In some embodiments, the worm gear 152 is configured to engage a rotatable drive member 154 that provides rotational force to the worm gear 152. In some other embodiments, the worm gear 152 may be engaged through one or more gears (not shown in FIG. 1) with the rotatable member 130 or one or more of the rollers 120 and 121 to provide rotational force to the worm gear 152.

Figure 2:
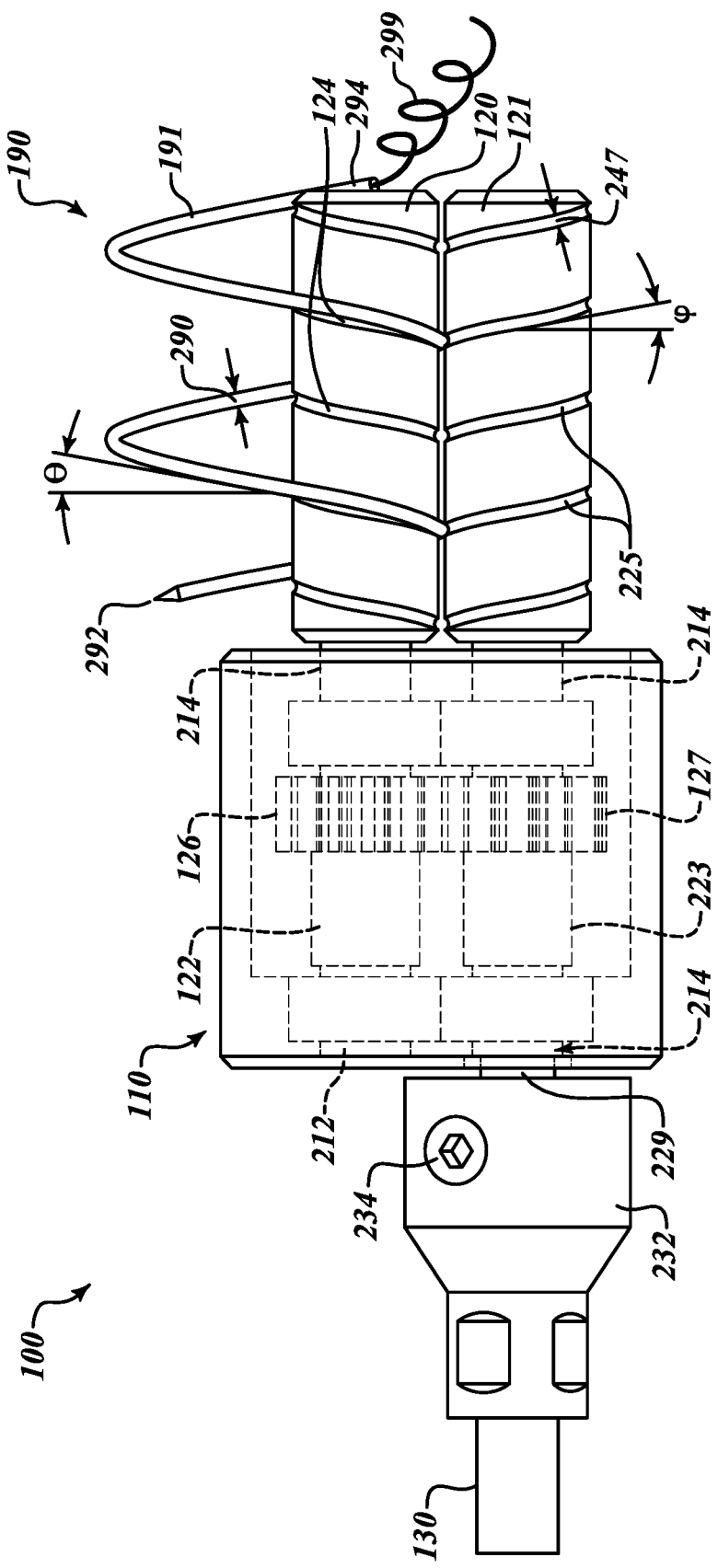
FIG. 2 is a perspective view in partial cutaway form of the apparatus of FIG. 1.

Referring additionally to FIG. 2, in various embodiments both the rollers 120 and 121 include grooves 124 and 225, respectively, to engage the shaft 191 of the needle 190. As shown in FIG. 2, the grooves 124 and 225 are pitched in opposite directions to pinchably and rollably engage the shaft 191 of the needle 190. A width 247 of the grooves 124 and 225 is sized to releasably engage a width 290 of the shaft 191 of the needle 190. A pitch φ of the grooves 124 and 225 match a pitch θ of the needle 190. The corresponding widths 247 and 290 and corresponding pitches φ and θ enable the rollers 120 and 121 to drive eccentric rotation of the needle 190 around the roller 120 as the rollers 120 and 121 counter-rotate. The needle 190 itself includes a leading end 292 that is shaped to pierce an object or objects, such as without limitation tissues that may include edges of donor and receiving passages to be sutured together by the apparatus 100 (FIG. 1). The needle 190 also may include a trailing end 294 configured to receive or to be attached to a filament 299 that is used to suture together the object.

Still referring to FIG. 2, the rollers 120 and 121 include cylinders 122 and 223, respectively, that are rotatably received in the frame 110. At one end, the cylinders 122 and 223 may be rotatably received in cylindrical openings 214 that extend through the frame 110. At an opposing end, each of the cylinders 122 and 223 may be received in a rounded recess 212 or in a cylindrical opening 214. In some embodiments the cylindrical opening 214 may enable a drive shaft 229, that is fixably coupled with the roller 121, to extend through the frame 110. In such embodiments, the drive shaft 229 may thus engage the rotatable member 130, thereby providing rotational force to the roller 121. The rotational force is also provided to the roller 120 via the interleaved drive gears 126 and 127, thereby causing the roller 120 and the roller 121 to counter-rotate. It will be appreciated that, in some other embodiments, the drive shaft 229 may be fixably coupled with the roller 120 such that the interleaved drive gears 126 and 127 impart rotational force to the roller 121, thereby causing the roller 120 and the roller 121 to counter-rotate.

In various embodiments, the rotatable member 130 may be mechanically joined to the drive shaft 229 by a coupling 232 which may be securable and removable by an attachment device 234, such as without limitation an inset screw. The rotatable member 130 may be driven by a motor (not shown in FIG. 2) that is disposed external to the apparatus 100. The cylindrical openings 214 and/or the rounded recess 212 may include bushings (not shown in FIG. 2) formed of nylon or other materials to reduce friction and/or vibration between the rollers 120 and 121 and the frame 110 and/or between the drive shaft 229 and the frame 110.

Figure 3:
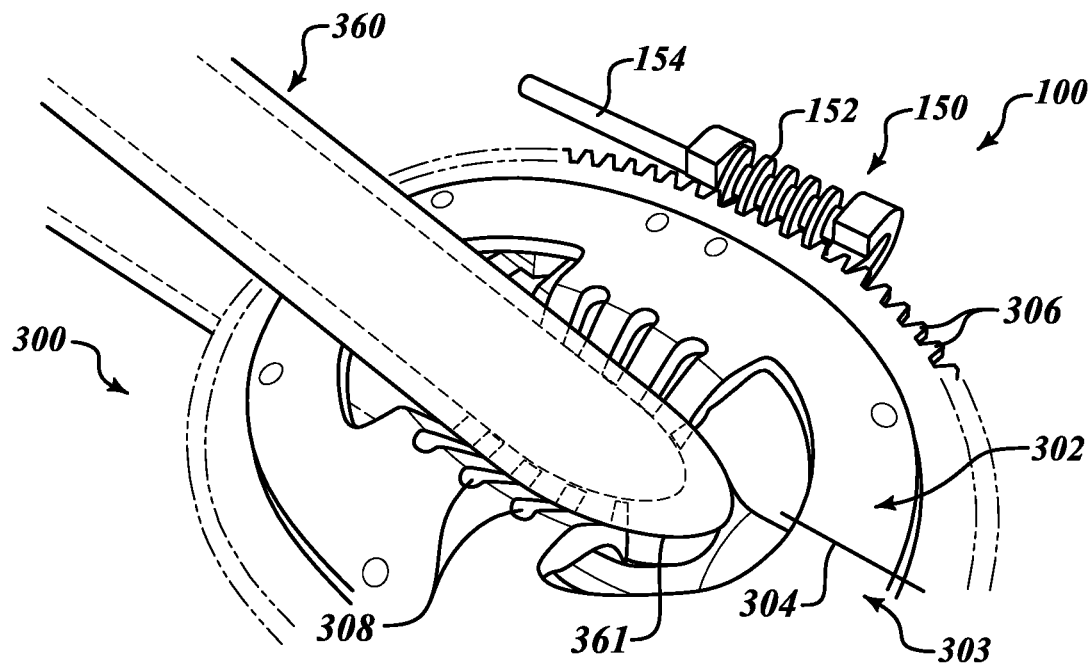
FIGS. 3 and 4 are top and bottom perspective views, respectively, of the apparatus of FIG. 1 positioned on a drive track for guiding the apparatus of FIG. 1.

Referring additionally to FIG. 3, in various embodiments a drive track 300 is used to guide the apparatus (not shown in FIG. 3) around an object to be sutured. FIG. 3 shows a donor passage 360 having a distal edge 361 to be joined to a receiving passage (not shown in FIG. 3) as in an anastomosis procedure. The drive track 300 may include separate sections 302 and 303 that may be positioned around an object, such as the donor passage 360, and then mechanically coupled at a junction 304. The drive track 300 supports teeth 306 that are shaped and sized to be engaged by the worm gear 152. In various embodiments, rotational force imparted by the rotational drive member 154 drives the worm gear 152 and, thus, causes the worm gear 152 to translate the apparatus 100 along the guide track 300. The interaction of the worm gear 152 and the drive track 300 thus causes the apparatus 100 to translate along an edge of the object, such as the distal end 361 of the donor passage 360. In various embodiments the drive track 300 includes inner channels 308 defined along the object that enable the needle (not shown in FIG. 3) to extend from the apparatus 100 to and through the object.

Figure 4:
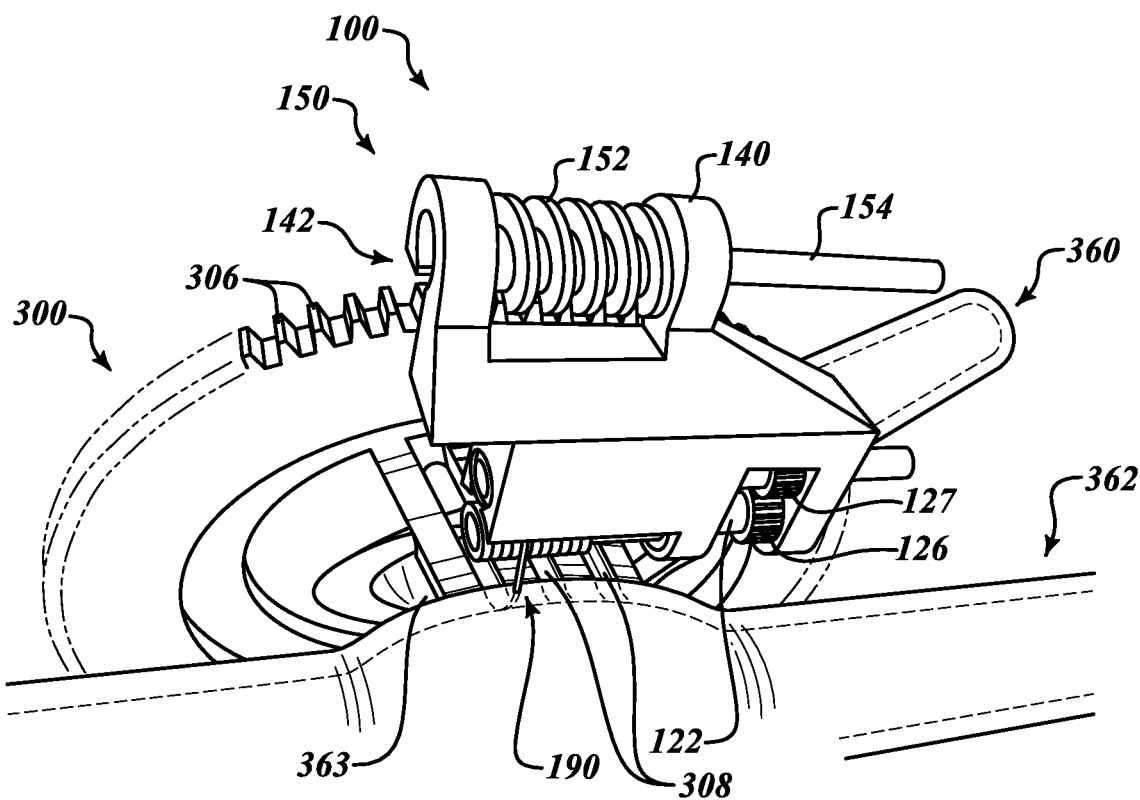

Referring additionally to FIG. 4, the guide bracket 140 of the frame 110 guides the apparatus 100 along the drive track 300. The receiving passage 362 defines an opening 363 beneath the drive track 300. The guide bracket 140 engages the drive track 300, and the drive track 300 is received in the internal guide 142 defined by the guide bracket 140. As previously described, the guide bracket 140 holds the worm gear 152 against the teeth 306 of the drive track 300. As a result, rotational force imparted to the worm gear 152 by the rotational drive member 154 causes the worm gear 152 to move the apparatus 100 around the drive track as the needle 190 passes through the channels 308 in the drive track 300 to suture the object.

Figure 5:
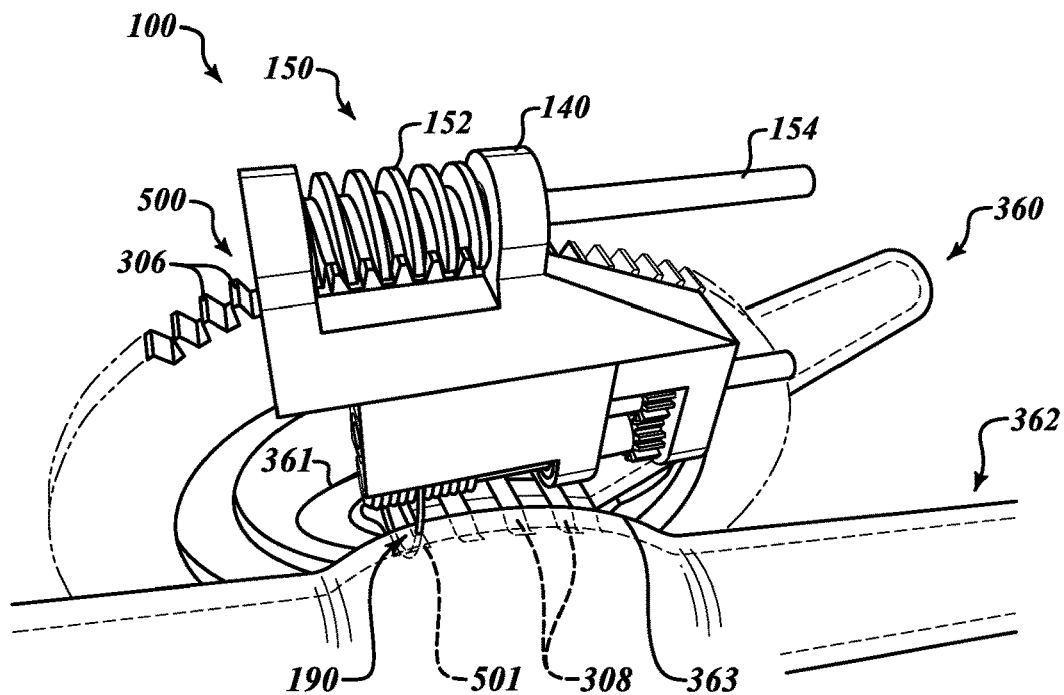
FIGS. 5 and 6 are views of the apparatus of FIG. 1 at different locations along the guide track of FIGS. 3 and 4 to illustrate a process of suturing using the apparatus of FIG. 1.
Figure 6:
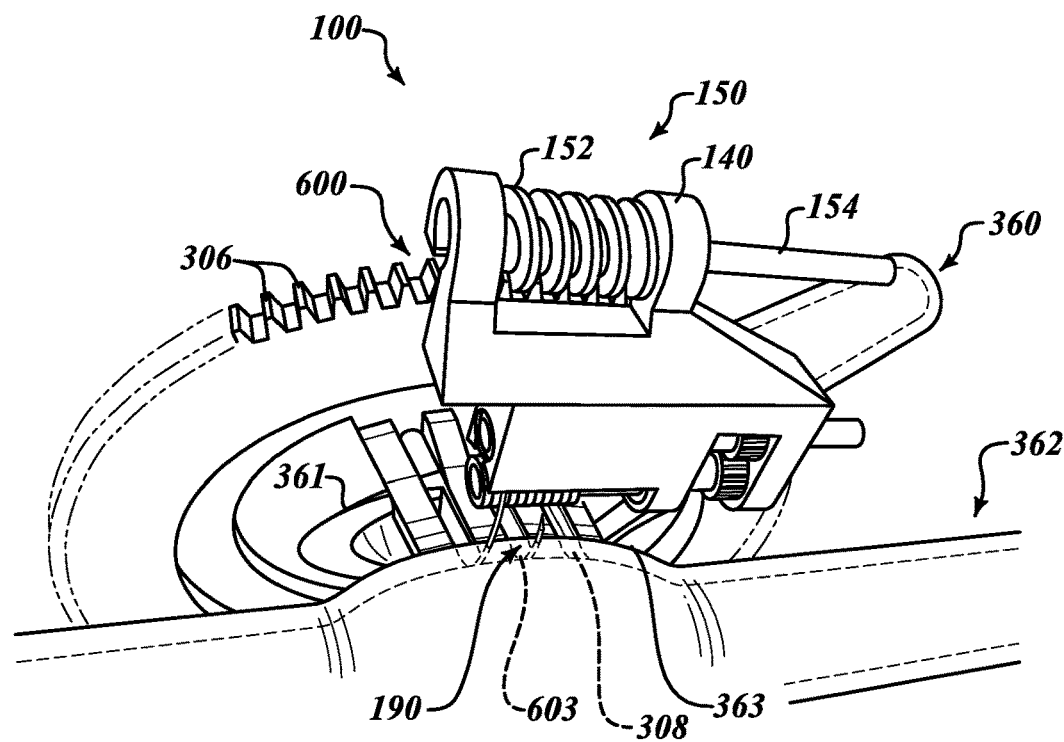

Referring additionally to FIGS. 5 and 6, the apparatus 100 moves around the drive track 300 as the needle 190 is rotated to suture the object. As shown in FIG. 5, the apparatus 100 is situated at a first point 500 along the drive track 300, and the needle 190 extends through a first channel 501 in the drive track 300. As shown in FIG. 6, rotation of the worm gear 152 has moved the apparatus 100 along the guide track 300 to a second point 600 while the needle 190 has been rotated. As a result, the needle 190 now extends through a second channel 603 in the drive track 300. The motion of the apparatus 100 around the guide track 300 as the needle 190 is rotated through an object thus sutures the object (which in this non-limiting example is a juncture of the donor passage 360 and the receiving passage 362).

It will be appreciated that, as shown in FIGS. 3-6, the drive track 300 suitably is a rounded track configured to lead the apparatus 100 around an object to suture the object, for example, to join passages together. However, it will be appreciated that a linear drive track may be used to form a linear suture, for example, to close a wound or incision. Thus, it will be appreciated that disclosed embodiments are not intended to be limited to a drive track 300 of any particular shape or size and no such limitation is to be inferred.

Figure 7:
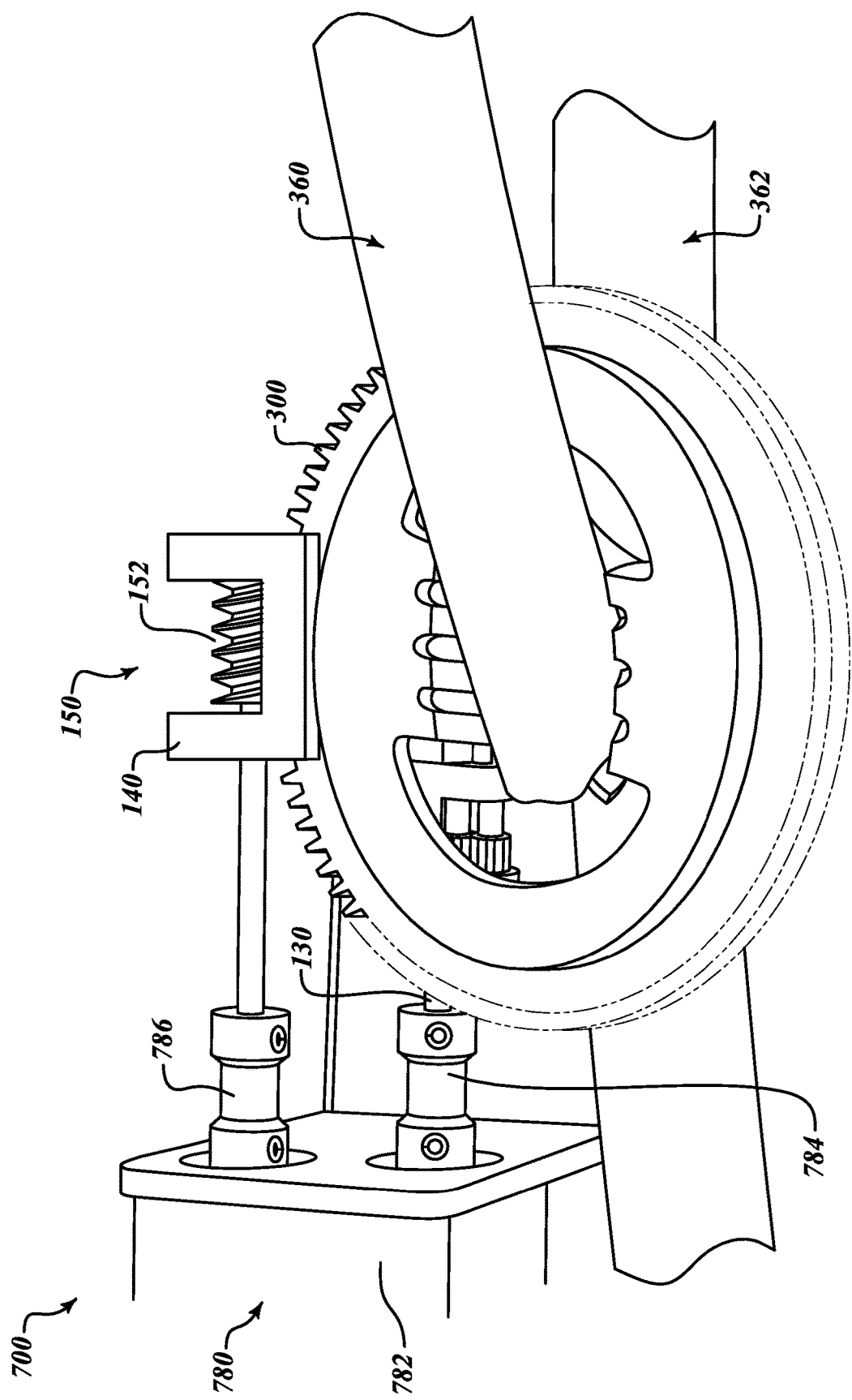
FIG. 7 is a perspective view of a system having a motor to impart rotational force to the apparatus of FIG. 1.

Referring additionally to FIG. 7 and in various embodiments, in an illustrative system 700 the drive track 300 is positioned around the object or objects to be sutured. A motor 780 provides rotational force to rotate the rollers 120 and 121 (not shown in FIG. 7) and to drive the worm gear 152. In various embodiments, a single motor 780 or multiple motors (not shown) may be used to provide rotational force to the rollers 120 and 121 and the worm gear 152 of the drive mechanism 150. The motor 780 may include a gear box 782 so that, as desired, the single motor 780 may provide rotational force at different speeds to the rotational member 130 that is coupled with the rollers 120 and 121 and the rotational drive member 154 that is coupled to the worm gear 152 of the drive mechanism 150. The system 700 may include drive linkages 784 and 786 to connect with the rotational member 130 and the rotational drive member 154. The drive linkages 784 and 786 may include flexible drive cables to provide rotational force while accommodating motion and positioning of the apparatus 100.

In various embodiments and as shown in FIG. 7, the gear box 782 may be positioned at or adjacent to the motor 780 with multiple drive linkages 784 and 786 extending to the rollers 120 and 121 and to the drive mechanism 150. In some other embodiments, the gear box 782 may be positioned at the apparatus 100 so that rotational force imparted to one of the rollers 120 and 121 may be mechanically conveyed to the drive mechanism 150 or vice versa. As a result, with only a single linkage extending from the motor 780 to the apparatus, in such embodiments rotational force may be provided to both the rollers 120 and 121 and to the drive mechanism 150.

Figure 8:
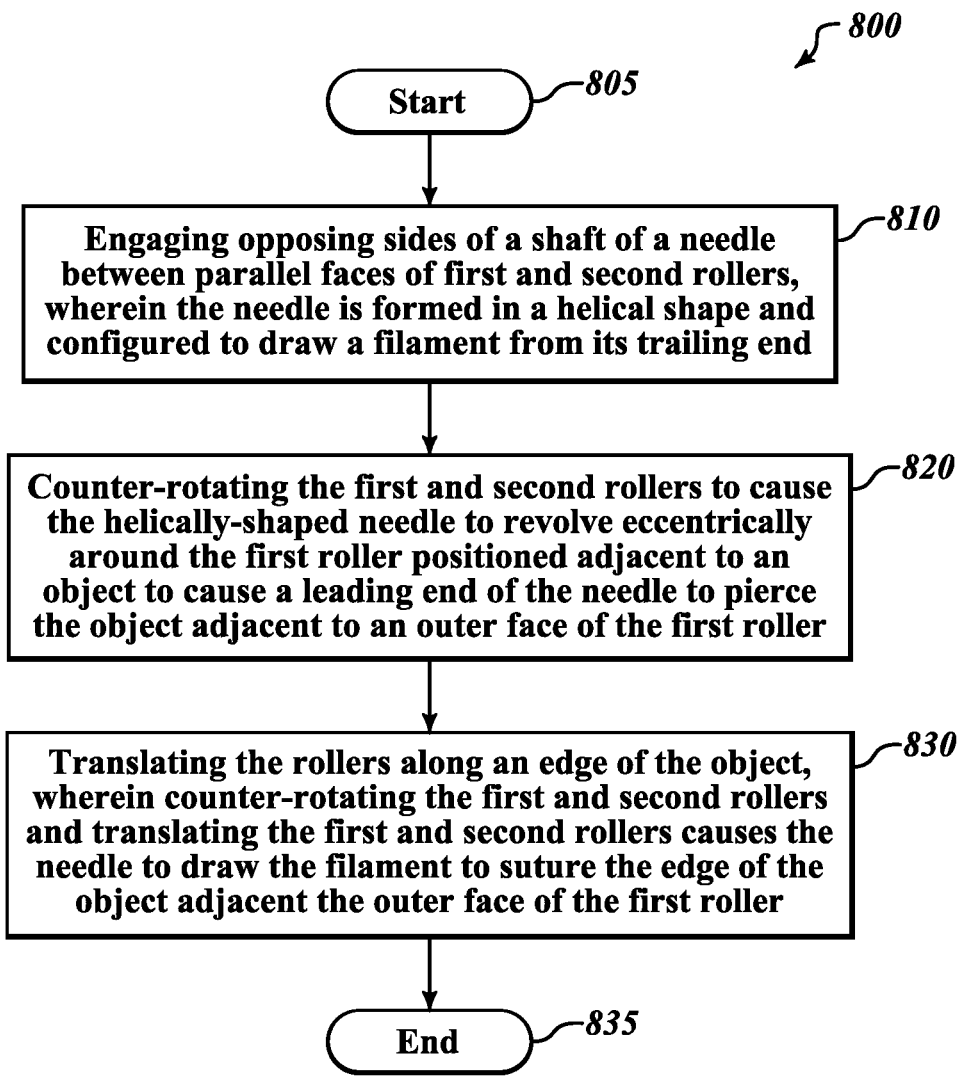
FIG. 8 is a flow diagram of an illustrative method of suturing an object.

Referring additionally to FIG. 8, in various embodiments an illustrative method 800 of suturing an object, such as in an anastomosis, is provided. The method 800 starts at a block 805. At a block 810, opposing sides of a shaft of a needle are engaged between parallel faces of first and second rollers, where the needle is formed in a helical shape and is configured to draw a filament from its trailing end. At a block 820, the first and second rollers are counter-rotated to cause the helically-shaped needle to revolve eccentrically around the first roller that is positioned adjacent to an object. Counter-rotation of the first and second rollers causes a leading end of the needle to pierce the object adjacent to an outer face of the first roller. At a block 830, the first and second rollers are translated along an edge of the object.

Counter-rotating the first and second rollers and translating the first and second rollers causes the needle to draw the filament to suture the edge of the object adjacent the outer face of the first roller. With the object sutured, the method 800 ends at a block 835.

It will be appreciated that the detailed description set forth above is merely illustrative in nature and variations that do not depart from the gist and/or spirit of the claimed subject matter are intended to be within the scope of the claims. Such variations are not to be regarded as a departure from the spirit and scope of the claimed subject matter.

What is claimed is:

1. A method comprising:
engaging opposing sides of a shaft of a needle between parallel faces of first and second rollers, wherein the needle is formed in a helical shape and configured to draw a filament from its trailing end;
counter-rotating the first and second rollers to cause the helically shaped needle to revolve eccentrically around the first roller positioned adjacent to an object to cause a leading end of the needle to pierce the object adjacent to an outer face of the first roller; and
translating the rollers along an edge of the object, wherein counter-rotating the first and second rollers and translating the first and second rollers causes the needle to draw the filament to suture the edge of the object adjacent the outer face of the first roller.

2. The method of claim 1, wherein the first and second rollers are inversely rotationally coupled so that rotation of the first roller causes the second roller to rotate in an opposite direction.

3. The method of claim 2, further comprising applying an external source of rotational force to one of the first roller and the second roller to cause the first and second rollers to counter-rotate.

4. The method of claim 3, wherein counter-rotating the first and second rollers causes the first and second rollers to translate along the edge of the object by a process chosen from mechanically coupling a drive mechanism to the first and second rollers so that rotating the first and second rollers causes the drive mechanism to translate the first and second rollers along the edge of the object and applying an additional source of rotational force to the drive mechanism to translate the first and second rollers along the edge of the object.

5. The method of claim 4, further comprising positioning a drive track engageable by the drive mechanism along the edge of the object to guide the translation of the first and second rollers along the edge of the object.

6. The method of claim 5, further comprising coupling together sections of the drive track around the object and joining together the sections of the drive track around the object.

7. A method for applying a suture to an object, the method comprising:
attaching a filament to a trailing end of a helically shaped needle;
inserting the helically shaped needle between faces of a first roller and a second roller, wherein the first roller and the second roller are rotatably mounted parallel with each other in a frame; and
piercing an edge of the object in a first location with a leading end of the helically shaped needle by revolving the helically shaped needle about a needle axis;
drawing the filament through the object by continuing to revolve the helically shaped needle; and
translating the helically shaped needle linearly along the edge of the object by translating the frame holding the first roller and the second roller.

8. The method of claim 7, wherein the revolving the helically shaped needle around the needle axis includes revolving the first roller in a first direction and the second roller in a second direction opposite the first direction.

9. The method of claim 8, wherein revolving the first roller includes the first roller rotating around a first roller axis, wherein the first roller axis is noncolinear with the needle axis.

10. The method of claim 7, further comprising piercing the edge in a second location, wherein the second location is linearly transposed from the first location.

11. The method of claim 7, wherein the translating includes counter-rotating the first roller and the second roller which causes the first and second rollers to translate along the edge of the object by a process chosen from mechanically coupling a drive mechanism to the first and second rollers so that rotating the first and second rollers causes the drive mechanism to translate the first and second rollers along the edge of the object and applying an additional source of rotational force to the drive mechanism to translate the first and second rollers along the edge of the object.

12. The method of claim 7, wherein the translating the helically shaped needle includes positioning a drive track engageable by a drive mechanism along the edge of the object to guide the translation of helically shaped needle along the edge of the object.

13. The method of claim 12, wherein the positioning the drive track includes coupling together sections of the drive track around the object.

14. The method of claim 13, wherein the coupling includes mechanically joining together the sections of the drive track around the object.

15. A method comprising:
inserting a helically shaped needle between faces of a first roller and a second roller, wherein the first roller and the second roller are rotatably mounted parallel with each other in a frame; and
piercing an edge of an object in a first location with a leading end of the helically shaped needle by revolving the helically shaped needle about a needle axis; and
drawing a filament extending from a trailing end of the helically shaped needle through the object by continuing to revolve the helically shaped needle; and
translating the helically shaped needle linearly along the edge of the object by translating the frame holding the first roller and the second roller.

16. The method of claim 15, further comprising piercing the edge in a second location, wherein the second location is linearly transposed from the first location.

17. The method of claim 15, wherein the translating the helically shaped needle includes positioning a drive track engageable by a drive mechanism along the edge of the object to guide the translation of helically shaped needle along the edge of the object.

18. The method of claim 17, wherein the positioning the drive track includes coupling together sections of the drive track around the object.

19. The method of claim 18, wherein the coupling includes mechanically joining together the sections of the drive track around the object.

* * * * *